ated Apr. 13, 1915.
UNITED STATES PATENT OFFICE.

JOHN FRANK WEAVER, OF LANCASTER, PENNSYLVANIA.

COMPOSITION OF MATTER TO BE USED FOR FEEDING LIVE STOCK.

1,135,417. Specification of Letters Patent. Patented Apr. 13, 1915.

No Drawing. Application filed April 9, 1914. Serial No. 830,618.

*To all whom it may concern:*

Be it known that I, JOHN FRANK WEAVER, a citizen of the United States, residing at Lancaster, in the county of Lancaster and State of Pennsylvania, have invented a new and useful Composition of Matter to be Used for Feeding Live Stock, of which the following is a specification.

This composition relates to a feeding stuff, which may be utilized for various purposes, and has for its principal object, to provide as a new and complete composition of matter, a feeding stuff, which may be manufactured and fed, without further preparation.

A further object of the present invention is to provide as a new and complete composition of matter, a feeding stuff of dried granular form, said feeding stuff being composed of (ground flax seed, with the oil extracted), cotton seed meal, sugar-cane, and molasses, so proportioned as to be easily digested and containing a maximum of carbo-hydrates.

With these and other objects in view, the composition consists of the improvements hereinafter described, and finally claimed.

As is commonly known, oil meal, cotton seed meal, and dried sugar-cane are rich in protein fat and fiber, and are easily digested in contra-distinction to other dried prepared feeding stuffs.

Almost any well known mixed feed will increase the capacity of milk of a cow; while it has been determined that carbo-hydrates are essential, if it is desired to increase the fat in milk.

The proportion of the ingredients as hereafter mentioned, will not be strictly adhered to, as it has been found that to obtain the best results, it is required to have a report made on the quantity of milk delivered at that time by the cow, and the richness in butter fat of the milk, but for all general purposes, the ingredients are compounded in the following proportions, to wit:—about fifteen per cent. flax seed meal, about twenty per cent. cotton seed meal, about sixty per cent. granulated dried sugar-cane, and about five per cent. molasses, or any similar binder. The whole is mixed, and assumes a dry powdery or flaky substance, which can be used without further preparation for live stock of all descriptions, whether for fattening purposes, or increasing the fat in milk, as it contains a large amount of nitrogen free extract, water extract, crude ash and carbo-hydrates.

The above described feeding stuff is an advantage, as all the constituent parts contain an element necessary to produce fat in milk; and also to increase the weight of live stock; and is cheaper than any other mixed feed stuffs, for the reason that the extracted sugar-cane is a refuse of the sugar-cane, after the sugar has been crushed out of it, and heretofore, has been thrown away. So that bulk for bulk, my ingredients will cost less in both freight transit, and actual cost.

What I claim as new, and desire to secure by Letters Patent is:—

1. A composition of matter, comprising a dry mixture, being composed of flax seed meal, cotton seed meal, extracted dried sugar-cane, and a suitable binder, substantially as specified.

2. A composition of matter comprising the herein described dried mixture composed of about twenty-five per cent. flax seed meal; about twenty per cent. cotton seed meal; about fifty per cent. dried sugar-cane; and about five per cent. molasses to bind the whole, substantially as specified.

In testimony whereof I affix my signature in presence of two witnesses.

JOHN FRANK WEAVER.

Witnesses:
CHARLES G. WAIT,
WALTER B. GEIGER.

Copies of this patent may be obtained for five cents each, by addressing the "Commissioner of Patents, Washington, D. C."